W. J. BARRON.
TYPE WRITING MACHINE.

No. 295,475. Patented Mar. 18, 1884.

WITNESSES:
F. McArdle,
N. W. Allison.

INVENTOR:
Walter J. Barron,
BY James Densmore.
ATTORNEY.

United States Patent Office.

WALTER J. BARRON, OF NEW YORK, N. Y., ASSIGNOR, BY MESNE ASSIGNMENTS TO THE AMERICAN WRITING MACHINE COMPANY, OF NEW YORK.

TYPE-WRITING MACHINE.

SPECIFICATION forming part of Letters Patent No. 295,475, dated March 18, 1884.

Application filed August 28, 1879.

*To all whom it may concern:*

Be it known that I, WALTER J. BARRON, of the city, county, and State of New York, have invented Improvements in Type-Writing Machines, of which the following is a specification.

The nature of the invention is, in a type-writing machine, in the combination of two series of ratchet-teeth, which are adapted to move alternately in one direction, each independently of the other, for a letter-space distance at a time, with the driving mechanism and carriage, and with only one letter-space ratchet, which is adapted to work alternately in both series of ratchet-teeth, first in one and then in the other; in the combination of two ratchet-wheels, which are adapted to turn alternately in one direction, each independently of the other, for a letter-space distance at a time, with the driving mechanism and carriage, and with only one letter-space ratchet, which is adapted to work alternately in both ratchet-wheels, first in one and then in the other; and in the combination of two ratchet-wheels, which are adapted to turn alternately in one direction, each independently of the other, for a letter-space distance at a time, the first of which is attached to the driving mechanism and the second to the first, with a spring on the first ratchet-wheel, which is adapted to press against and turn the second one, with an arm or shoulder on the second ratchet-wheel, which is adapted to strike and stop against the first one, and with only one letter-space ratchet, which is adapted to work alternately in both ratchet-wheels, first in one and then in the other.

Figure 1:
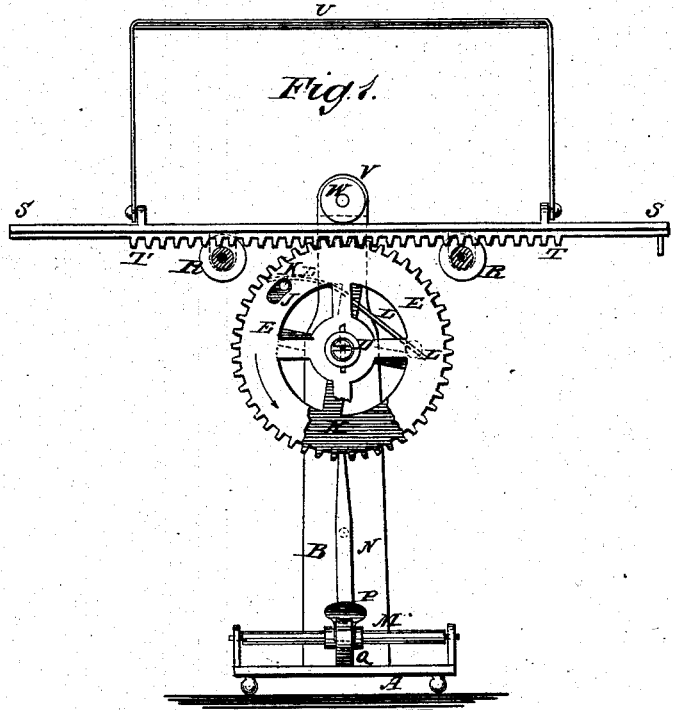
Figure 2:
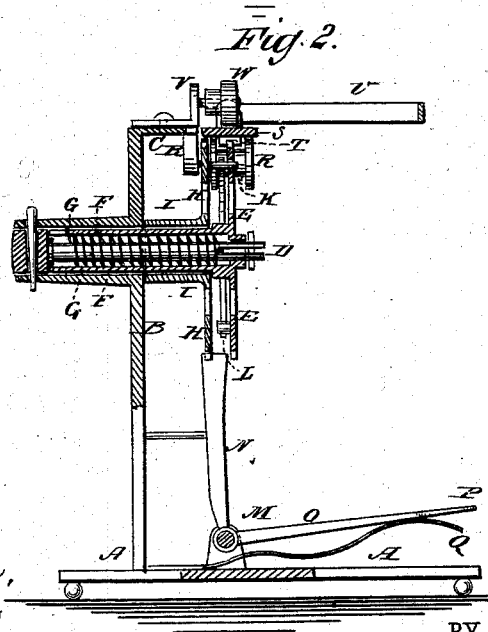

The invention is illustrated by the accompanying drawings, of which the following is a description:

Figure 1 represents a front view, and Fig. 2 a side view, of the invention.

A represents the base-frame of a type-writing machine; B, a side plate or standard on the base-frame A; C, a top plate on the standard B; D, an axle on the standard B under the top plate, C; E, a toothed wheel loose on the axle D; F, a long collar or hub loose on the axle D and attached to the toothed wheel E; G, a spiral spring within and attached at one end to the wheel-hub F or wheel E, and around and attached at the other end to the axle D; H, another toothed wheel, similar to the first wheel, E, loose on the wheel-hub F; I, a collar or hub attached to the second wheel, H, and loose on the wheel-hub F; J, a concentric slot through the first wheel, E; K, an arm or shoulder on the second wheel, H, and extended into the first-wheel slot, J; L, a spring, attached to the first wheel, E, and adapted to press on and turn the second wheel, H; M, a bar across over and adapted to rock on the base-frame A, under the toothed wheels E H; N, a ratchet on the rocking bar M, and adapted to work in the toothed wheels E H; O, a frame or lever extended forward from the rocking bar M; P, a key on the fore end of the vibratory frame or lever O; Q, a spring on the base-frame A, and adapted to press up against the vibratory frame or key-lever O P; R, a small wheel, which has a grooved periphery, loose in or on bearings at each side of the top plate, C; S, a carriage-base or guide-bar adapted to move reciprocally and ride on the bearing-wheels R; T, a cogged rack on the under side of the carriage-base or guide-bar S, and adapted to ride within the periphery-grooves on the bearing-wheels R, and to work in the first toothed wheel, E; U, a carriage-frame on and pivoted to the carriage-base or guide-bar S; V, a lug on the top plate, C; and W another bearing-wheel, loose on or in bearings on the top-plate lug V, and adapted to bear on the carriage-base or guide-bar S.

At rest the ratchet N is in the second toothed wheel, H; but the depression of the vibratory frame or key-lever O P oscillates the rocking bar M and vibrates and draws the ratchet forward out of its notch of the second wheel, H, and into a notch of the first toothed wheel, E. When thus released, the spring L turns the second wheel, H, forward till the shoulder K strikes and stops against the fore end of the first-wheel slot, J, the distance of the play of the shoulder in the slot, which is the distance of a notch-space of the wheel. When released from pressure, the base-spring Q lifts to place the vibratory frame or key-lever O P, and oscillates backward the rocking bar and ratchet M N, and thrusts the ratchet out of its notch of the first wheel, E, and again into a notch of the second wheel, H; but as the second wheel has been turned forward a notch-space distance the ratchet now enters the notch next back of the one it was in before, and when thus released the driving-spring G turns the first wheel, E, forward till it strikes and stops against the second-wheel shoulder, K. As the first wheel, E, is meshed therewith in thus turning, it moves forward the cogged rack T and carriage S U the same distance, which is a letter-space distance, and thus the depression and release of the vibratory frame or key-lever O P vibrate the ratchet N forth and back alternately in the two toothed wheels E H, and allow the wheels to turn and move the carriage S U forward a letter-space distance at each vibration. The driving-spring G constantly strives to turn the first toothed wheel, E, which is only held from turning by the ratchet N or the second-wheel shoulder, K, and the spring L constantly strives to turn the second toothed wheel, H, which is only held from turning by the ratchet N or first-wheel stop, J. Thus the ratchet N holds from turning whichever toothed wheel E or H it engages and allows to turn a notch-space distance whichever one it disengages, and as the carriage S U moves while the first wheel, E, turns and is held from moving while the second wheel, H, turns, the movement is thus regulated by the operation of the ratchet and toothed wheels N E H.

The object of the invention is to provide a device for holding the carriage S U at rest while a letter is impressed on the substance to be written on, and for moving it a letter-space distance after each impression, and also to provide a device for moving the carriage without friction and wabbling; and this object is effected efficiently and simply by the devices described.

No devices are shown for making impressions, nor for holding and moving in line-spacing the substance to be written on, because the invention is applicable to any of the common well-known devices for those purposes. Therefore

What I claim is defined and limited as follows:

1. In a type-writing machine, the combination of two series of ratchet-teeth, which are adapted to move alternately in one direction, each independently of the other, for a letter-space distance at a time, with the driving mechanism and carriage, and with only one letter-space ratchet, which is adapted to work alternately in both series of ratchet-teeth, first in one and then in the other.

2. In a type-writing machine, the combination of two ratchet-wheels, which are adapted to turn alternately in one direction, each independently of the other, for a letter-space distance at a time, with the driving mechanism and carriage, and with only one letter-space ratchet, which is adapted to work alternately in both ratchet-wheels, first in one and then in the other.

3. In a type-writing machine, the combination of two ratchet-wheels, which are adapted to turn alternately in one direction, each independently of the other, for a letter-space distance at a time, the first of which is attached to the driving mechanism and the second to the first, with a spring on the first ratchet-wheel, which is adapted to press against and turn the second one, with an arm or shoulder on the second ratchet-wheel, which is adapted to strike and stop against the first one, and with only one letter-space ratchet, which is adapted to work alternately in both ratchet-wheels, first in one and then in the other.

WALTER J. BARRON.

Witnesses:
E. DENNING LUXTON,
J. JAMES CAMPBELL.